(12) United States Patent
Salvant (10) Patent No.: US 7,798,513 B1
(45) Date of Patent: Sep. 21, 2010

(54) METHOD AND APPARATUS FOR TRAINING A PERSON TO RIDE A BICYCLE

(76) Inventor: Thomas A. Salvant, 125 Louise Dr., Mandeville, LA (US) 70448

( * ) Notice: Subject to any disclaimer, the term of this patent is extended or adjusted under 35 U.S.C. 154(b) by 230 days.

(21) Appl. No.: 12/016,928

(22) Filed: Jan. 18, 2008

(51) Int. Cl.
B62J 27/00 (2006.01)
B62K 13/00 (2006.01)

(52) U.S. Cl. ............... 280/304.3; 280/7.1; 280/259; 280/294

(58) Field of Classification Search ........... 280/304.3, 280/7.1, 259, 294
See application file for complete search history.

(56) References Cited

U.S. PATENT DOCUMENTS

| | | | |
|---|---|---|---|
| 1,965,194 A | 7/1934 | Koch | |
| 2,468,933 A | 5/1949 | Jones | |
| 2,660,442 A | 11/1953 | Wiesner et al. | |
| 3,648,542 A * | 3/1972 | Perotti et al. | 74/594.1 |
| 3,888,136 A * | 6/1975 | Lapeyre | 74/594.1 |
| 3,906,811 A | 9/1975 | Thun | |
| 4,730,840 A | 3/1988 | Goldmeier | |
| 5,226,820 A | 7/1993 | Pearson | |
| 5,259,638 A | 11/1993 | Krauss et al. | |
| 5,273,300 A | 12/1993 | Wells | |
| 5,493,937 A | 2/1996 | Edwards | |
| 5,791,203 A | 8/1998 | Chen et al. | |
| 5,791,675 A | 8/1998 | Fleischer | |
| 5,915,711 A | 6/1999 | Seiple | |
| 5,934,155 A * | 8/1999 | Lai | 74/594.1 |
| 6,003,889 A * | 12/1999 | Shalom | 280/259 |
| 6,264,226 B1 * | 7/2001 | Chang | 280/259 |
| 6,349,958 B1 | 2/2002 | Gawlik | |
| 6,581,494 B2 | 6/2003 | Sechler | |
| 6,688,192 B1 | 2/2004 | Badarneh | |
| 6,708,998 B1 * | 3/2004 | Blake | 280/259 |
| 6,769,708 B2 | 8/2004 | Ackerly | |
| 6,832,774 B1 | 12/2004 | Zaccagnini | |
| 6,874,387 B2 * | 4/2005 | Vaughn | 74/594.1 |
| 7,240,907 B2 | 7/2007 | Chen | |
| 7,267,030 B2 * | 9/2007 | French | 74/594.1 |
| 7,350,796 B2 * | 4/2008 | Misevski | 280/259 |
| 7,523,685 B2 * | 4/2009 | French | 74/594.1 |
| 2004/0026892 A1 | 2/2004 | Ackerly | |

(Continued)

FOREIGN PATENT DOCUMENTS

DE 3244466 6/1984

(Continued)

OTHER PUBLICATIONS

Webpage—www.RunBikes.com, "What is a Run/Balance Bike?", downloaded Aug. 17, 2007.

(Continued)

Primary Examiner—Lesley Morris
Assistant Examiner—Marlon A Arce
(74) Attorney, Agent, or Firm—Garvey, Smith, Nehrbass & North, L.L.C.; Brett A. North (57) ABSTRACT

A method and apparatus for training a beginning cyclist to ride a bicycle. One embodiment includes providing a bicycle with detachable pedals and at least a portion of the crank arms, and attaching guard shields on the remaining portions of the crank arms.

19 Claims, 10 Drawing Sheets

U.S. PATENT DOCUMENTS

2004/0150186 A1* 8/2004 Jakovljevic .................. 280/259
2005/0280225 A1 12/2005 Tamian
2007/0065784 A1* 3/2007 Nix .............................. 434/61
2008/0164673 A1* 7/2008 Lane et al. .................. 280/259

FOREIGN PATENT DOCUMENTS

DE 3936317 5/1991

OTHER PUBLICATIONS

Webpage—www.pedalcarsandretro.com, various bikes and accessories for sale, downloaded Aug. 5, 2007.
Webpage—www.runbikes.com, various bikes for sale, downloaded Aug. 5, 2007.
Webpage—www.azbikeparts.com, bike parts for sale, downloaded Aug. 5, 2007.
Webpage—www.bikehash.freeservers.com, "How to Teach Your Child to Ride a Bicycle in 5 Lessons", downloaded Aug. 17, 2007.
Webpage—www.sfbike.org, "Teaching Kids to Ride", downloaded Aug. 1, 2007.
Webpage—www.tc.umn.edu, "How to: Learn to Ride a Bicycle. Teach Kids to Bike with No Training Wheels", downloaded Aug. 17, 2007.
Webpage—www.pvglider.com, sale of glider to help a child learn to ride a bike, downloaded Aug. 17, 2007.
Webpage—www.bicyclesouth.com, "Riding Tips—Teaching Kids to Ride", downloaded Aug. 17, 2007.
Webpage—www.kiwibike.com, questions and answers regarding the Kiwi Bike, downloaded Aug. 17, 2007.
Webpage—www.runbikes.com, various bikes for sale, downloaded Aug. 17, 2007.
Webpage—www.pedalcarsandretro.com, homepage of Pedal Cars and Retro Collectables, describing kids wooden bikes and LIKEaBIKES, downloaded Aug. 17, 2007.
Webpage—www.albes.com, homepage of Albe's listing bike parts for sale, downloaded Aug. 5, 2007.
Webpage—www.fact-canada.com/Rotorcranks, downloaded Aug. 5, 2007.
Webpage—www.schwinnbike.com, bikes for sale, downloaded Aug. 5, 2007.

* cited by examiner

METHOD AND APPARATUS FOR TRAINING A PERSON TO RIDE A BICYCLE

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND

Learning how to ride a two wheel bicycle is a very difficult task for young children and beginner cyclists, especially since they lack the necessary coordination and balancing skills associated with said task. The customary approach for achieving bicycling skills is to use a set of training wheels, which is attached to the bicycle's rear wheel assembly, as portrayed in prior U.S. Pat. Nos. 6,588,788; 6,419,256; 6,318,745; D345,948, and others. However, using training wheels is antiquated and ineffective. One major drawback is that the learner tends to lean on the training wheels for support much like riding a tricycle, creating a dependency for said training wheels, whereby preventing the learner from developing the necessary balancing skills. It could take weeks before the learner is weaned off these training wheel devices, whereby the learner develops balancing and coasting skills more by chance than from their design. Another disadvantage is that since there are many different bicycle models and sizes for the beginner, the manufacturing and stocking of each specific type of training wheel device for said models and sizes can get rather costly.

Alternative methods for learning how to ride a bicycle employ straps (U.S. Pat. No. 5,226,820 and others); seats (U.S. Pat. No. 6,631,948 and others); poles (U.S. Pat. No. 5,915,711 and others), and handles (U.S. Pat. Nos. 6,349,958; 5,791,675; 4,917,398 and others). The significant disadvantage of said devices is that a trainer must always be present and running along side the bicycle, while holding onto the training device. Up to now the development of said bicycling skills by the beginning cyclist is again delayed due to the dependency on the support against leaning to the left or right (from an imaginary vertical line) provided by the trainer and the training device. Gyroscopic support devices, such as U.S. Pat. No. 6,676,150 and others, also create a similar dependent conditions for the learner. Additionally, these gyroscopic devices can get very costly to manufacture, to stock and to purchase.

Certain training methods involve the providing of a training scooter which does not have pedals, a crank case, and/or crank arms. A beginning cyclist can learn to balance and coast on these training scooters, but must switch to a different bicycle with pedals to learn balancing and coasting while peddling. The switching to a different bicycle which has a different feel and weight is believed to inhibit the learning process. Additionally, these training scooters do no position the beginning cyclist's legs to approximate the position of the legs when learning to balance and coast while peddling.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

One embodiment generally relates to a method and apparatus for training beginner bicyclists on how to develop the proper balance and coordination skills necessary for riding a two wheel bicycle.

One embodiment provides an easy, unaided, and effective way for mastering said bicycling skills.

In one embodiment is provided a quick convertable training bicycle which is simple and easy to use, that self-teaches the beginner cyclist how to balance and ride a two wheel bicycle both with and without pedals.

In one embodiment a multi-piece crank can be used which can easily be taken apart to remove its lower sections and the pedals, and protectors can be placed on the remaining portions of the crank along with the sprocket and chain.

In one embodiment is provided a self-teaching method that will enable the beginner cyclist to develop balancing skills for riding a two wheel bicycle without being supported by another person and without relying on training wheels.

In one embodiment the method of training a person to ride a bicycle includes the steps of: (a) providing a training bicycle, the training bicycle having removable crank arms, and shields for shielding portions of the crank arms remaining; (b) removing at least a portion of each crank arm; (c) placing the shields over the remaining portions of the crank arms; adjusting the training bicycle so that the person's feet can be placed squarely on the ground; (d) having the beginning cyclist, while seated on the training bicycle, first walk the bicycle forward with small steps, then progresses to longer strides, and finally culminates with coasting; (e) having the beginner lift his feet up off the ground for a longer period of time each time while coasting, allowing the beginning cyclist to learn how to coordinate the steering and balancing skills together; and (f) after the beginning cyclist has demonstrated balancing skills, installing the lower portions of the crank arms and pedals to allow the beginning cyclist to ride the bicycle while peddling himself.

In one embodiment the beginning cyclist learns how to balance and coast while his feet are in a similar expanded position relative to the location of the cyclist's feet on the pedals so that an easy transition can be made from walking/balancing to actually peddling/balancing on the training bicycle.

In one embodiment this expanded position of the beginning cyclist's legs can be maintained without have snags and/or encumbrances to the feet of the beginning cyclist providing a feeling of freedom and security for this time period of the training. Prior art methods of training set up situations where the legs and/or feet of the beginning cyclist can be blocked, snagged, and/or encumbered limiting the ability of the beginner to achieve and/or maintain balance, causing a fall, and/or resistance/apprehension to future training.

In one embodiment the horizontal distance between the outer portions of the shields can be adjusted for different beginning cyclists to better approximate the position of the cyclist's feet when placed on the pedals for peddling.

In one embodiment the beginning cyclist learns how to balance and coast while the motion of his legs and/or feet are not obstructed and/or interfered with when the bicycle is being maneuvered forward. In this embodiment the beginning cyclist can unencumberly compensate for any sideways pivoting of the training bicycle (from a vertical position), without the fear and pain of obstructions from the bicycle (e.g., pedals) colliding with his legs.

BRIEF DESCRIPTION OF THE DRAWINGS

Reference will now be made to the drawings, wherein like parts are designated by like numerals, and wherein.

DETAILED DESCRIPTION OF AT LEAST ONE PREFERRED EMBODIMENT

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner. Reference will now be made to the drawings, wherein like parts are designated by like numerals.

Figure 1:
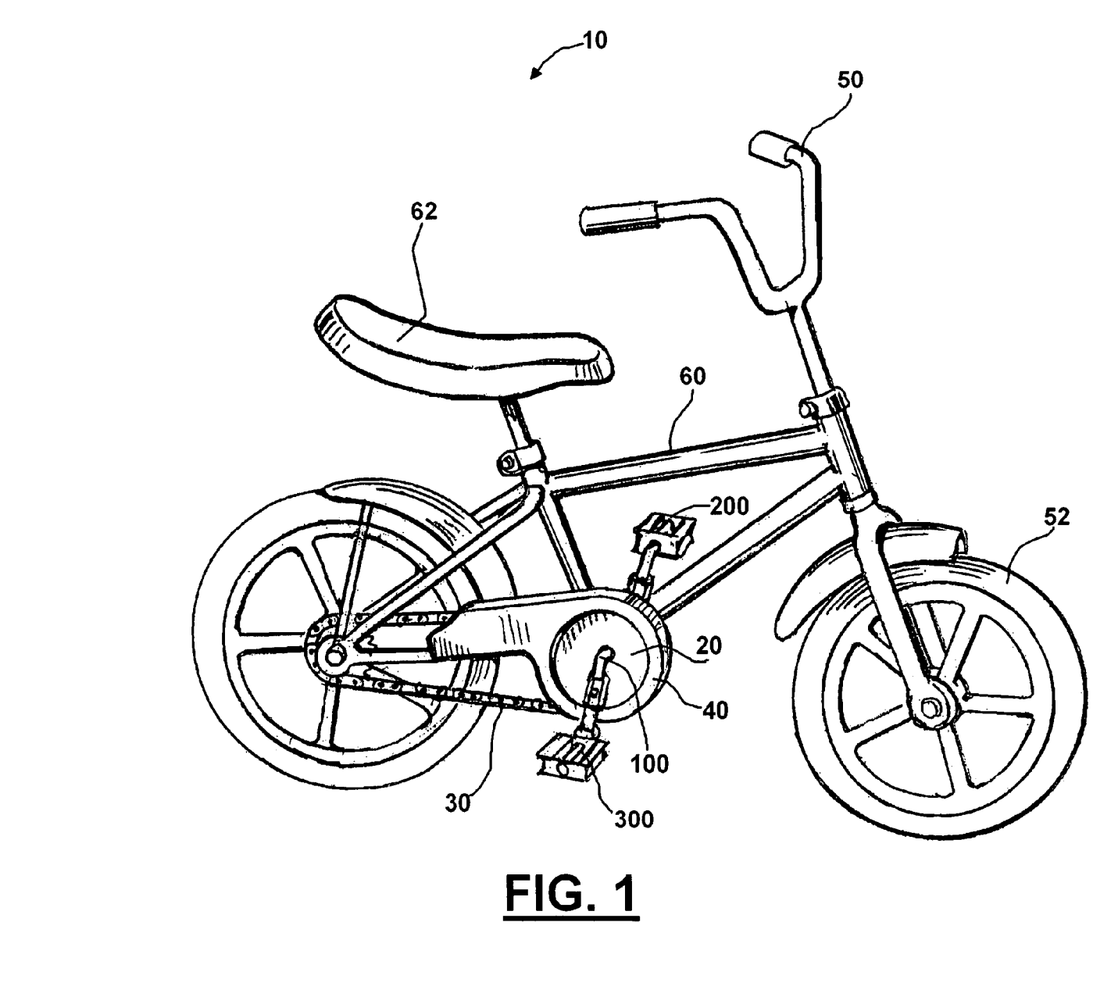
FIG. 1 is a perspective view of one embodiment shown the pedals attached to the crank arms.

FIG. 1 is a perspective view of a training bicycle 10 showing pedals 200,300 attached to the crank 100 arms. For all intents and purposes this training bicycle 10 can resemble conventionally available bicycles with the exception that at least a portion of the crank 100 arms (and pedals 200,300) are removably attached. The bicycle can include crank 100 rotatively connected to frame 60 via crank case 61. As part of the method and apparatus training bicycle 10 can be converted to a training mode where at least a portion of the crank 100 arms (and pedals 200,300) are removed.

Figure 2:
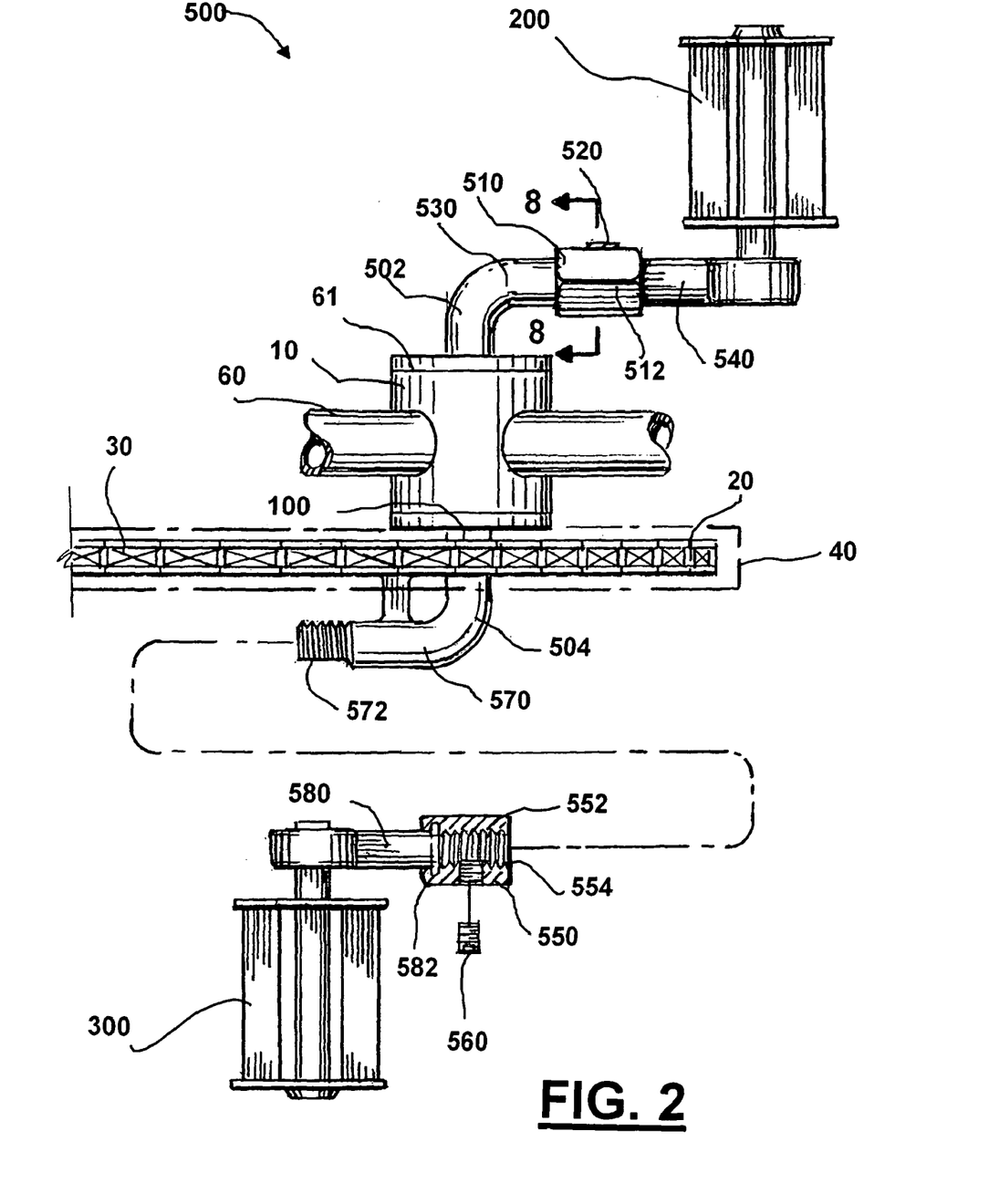
FIG. 2 is a bottom perspective view showing the pedals and lower portions of the crank arms being removed.
Figure 8:
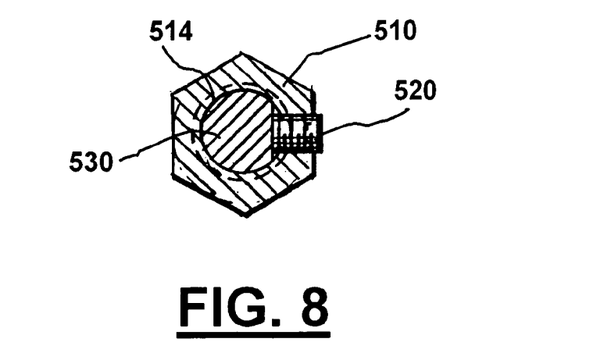
FIG. 8 is a sectional view of the crank and connector taken through the line 8-8 of FIG. 5.

FIG. 2 is a bottom perspective view showing one detachable embodiment 500. In this embodiment each crank arm 502,504 includes upper and lower sections (502 includes sections 530 and 540, and 504 includes sections 570 and 580) which are detachably connected to each other via first and second quick connect/quick disconnects 510 and 550. FIG. 8 is a sectional view of crank 100 (crank arm 502) and connector 510 taken through the line 8-8 of FIG. 5. First quick connect/quick disconnect 510 can be used to detachably connect upper section 530 (of first crank arm 502) with lower portion 540. It can comprise body 512 which is rotatably connected to upper section 530. Body 512 can have opening 514 which opening can be threaded. Body 512 can also include set screw 520.

Second quick connect/quick disconnect 550 can be used to detachably connect upper section 570 (of second crank arm 504) with lower portion 580. It can comprise body 552 which is rotatably connected to upper section 570. This rotatable connection can include head 582. Alternatively, body 552 can be non-rotatively affixed to lower section 580. Body 552 can have opening 554 which opening can be threaded with threads 554. Body 552 can also include set screw 560.

To convert training bicycle 10 into the initial training mode (e.g., balancing and coasting practice) by removing pedals 200,300 and installing shields 600,600'. FIG. 2 shows peal 300 being removed. Pedal 300 can be removed by removing quick lock/quick unlock 500 from upper crank arm portion 570. Set screw 560 and be removed and body 552 can be rotated to unscrew body 552. In this manner the exterior of body 552 can be shaped such that a wrench can be used. In FIG. 2, the exterior of body 552 has a hexagonal shape.

Figure 3:
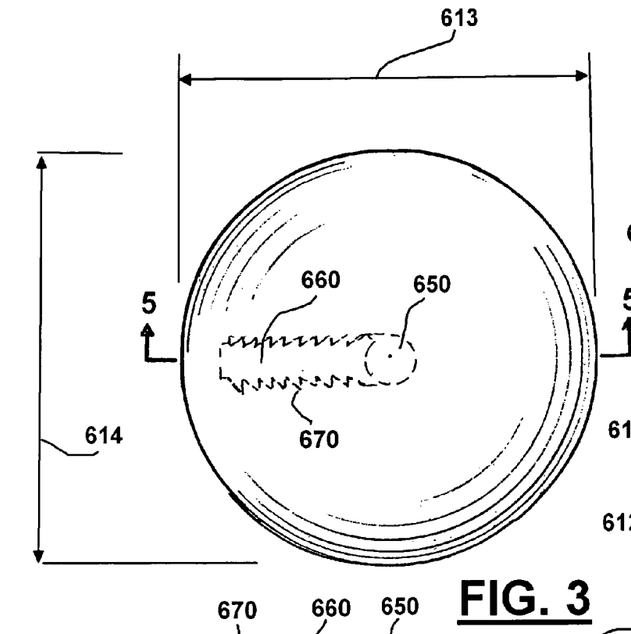
FIG. 3 is a top perspective view of a crank shield.
Figure 4:
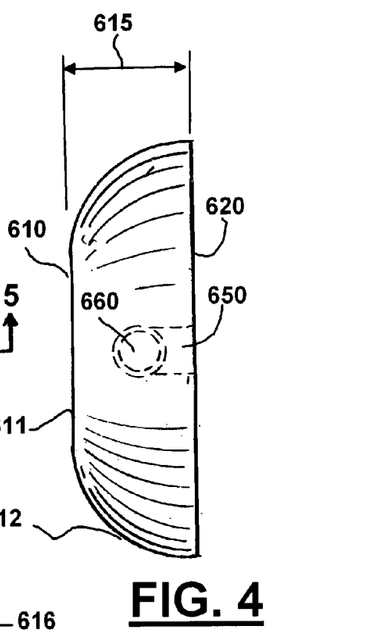
FIG. 4 is a side view of the crank shield of FIG. 3.
Figures 5, 6:
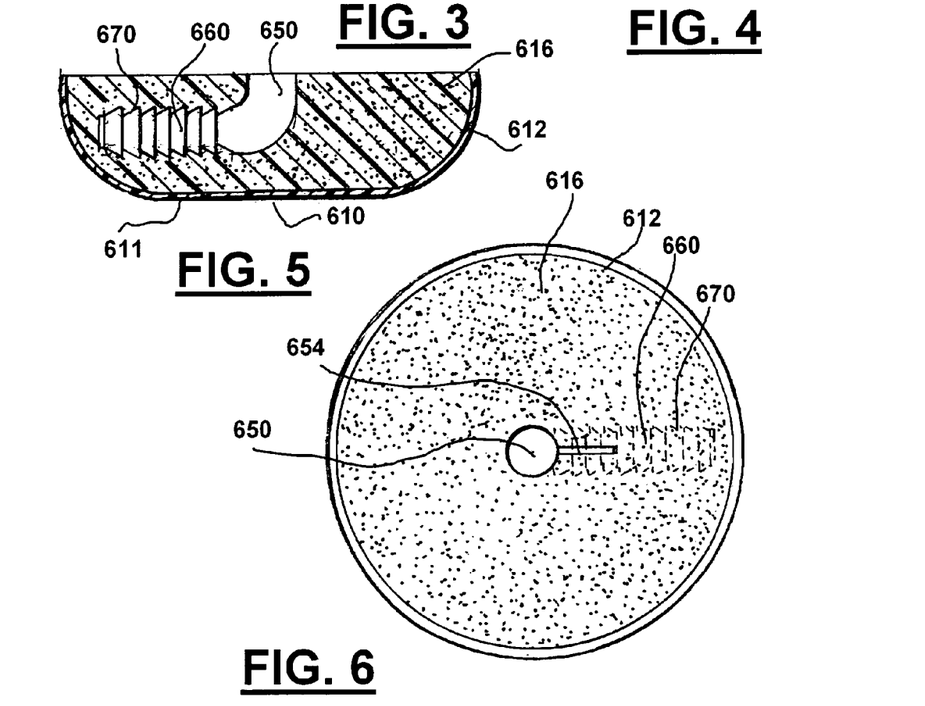
FIG. 5 is a sectional view of the crank shield of FIG. 3 taken along the line 5-5.
FIG. 6 is a bottom view of the crank shield of FIG. 3.

After lower section 580 is removed crank shield 600 can be placed over remaining upper section 570. FIG. 3 is a top perspective view of crank shield 600. FIG. 4 is a side view of crank shield 600. FIG. 5 is a sectional view of crank shield 600 taken along line 5-5 of FIG. 3. FIG. 6 is a bottom view of the crank shield 600. Crank shield 600 can comprise outer shell 610 having a flattened top 611, rounded side portion 612, and an interior 616. Shield 600 can have depth 615, length 613, and width 614. Preferably shield 600 has a circular cross section, and a rounded side portion 612. It is believed that this shape provides a comfortable usage for beginning cyclist during the balancing and coasting steps of the method of learning how to ride a bicycle.

Crank Shield 600 preferably includes a hardened outer shell made out of a material which is flexible and resistant to cracking. For example, the outer shell can be plastic, a polymer blend, wood, metal, or other materials which can shield the legs and feet of the beginning cyclist from obstructions.

Crank shield 600 can include a means for attaching and detaching crank shield 600. For example the interior 616 of crank shield 600 can be comprised of foam rubber having opening 650 and extended opening 660. Slit 654 can be included to assist in placing shield 600 over upper portion 570 remaining of crank arm 504. Preferably, a frictional type fit is used to attach shield 600. However, other fastening means can be used such as threaded fasteners, straps, velcro, adhesives, magnetic fasteners, etc. Preferably, a detachable (or non-permanent) connection is used so that the shield can be easily attached when needed, and then detached when not needed.

Preferably, the depth 615 of crank shield 600 is such that the beginning cyclist's 5 legs are spread apart from each other (during the balancing and coasting step) about the same as such legs would be spread apart when the cyclist's 5 feet 6 and 7 are on pedals 200 and 300. Such positioning makes easier the transition between the balancing and coasting step to the peddling step in the method. That is, the beginning cyclist's legs will be in about the same spaced apart condition for the balancing and coasting step to the peddling step—allowing the beginning cyclist to feel more comfortable when trying to balance and coast even when peddling. This is because the beginning cyclist's legs will be in about the same relative spaced apart condition during peddling (when the cyclist must also balance and coast), as when the beginning cyclist is learning to balance and coast without having to peddle.

Figure 7:
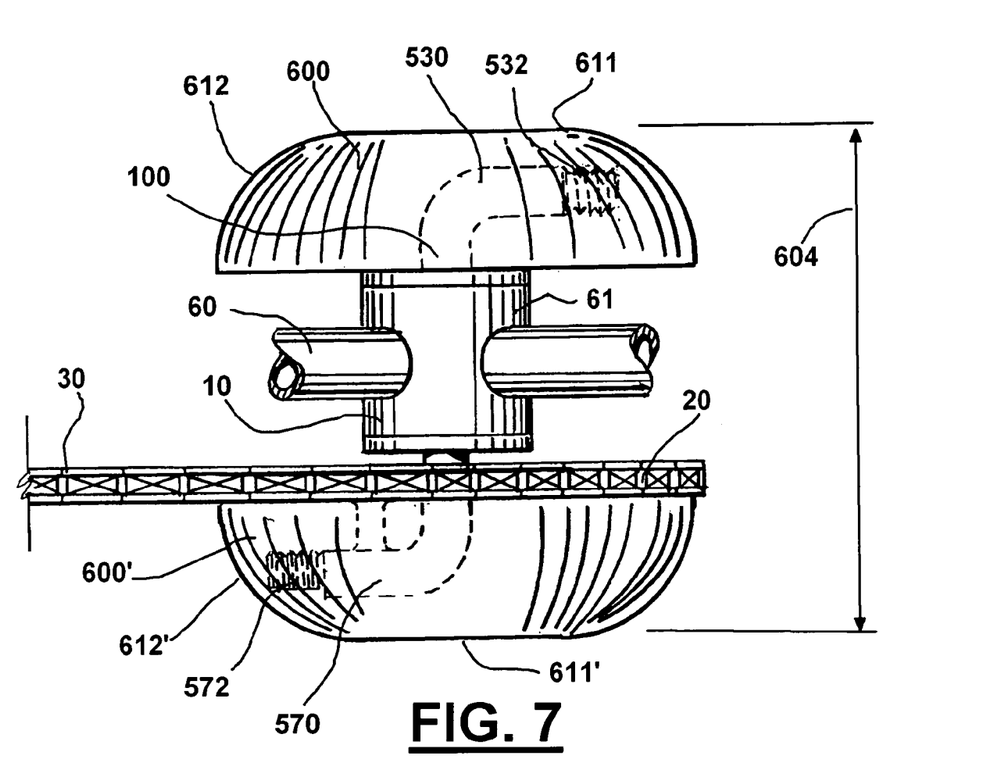
FIG. 7 is a bottom perspective view of the upper portions of the crank being covered by the crank shield.

FIG. 7 is a bottom perspective view of the upper portions 530,570 of the crank 100 being covered by crank shields 600,600'. Crank shield 600 can cover upper portion 570. Crank shield 600' can cover upper portion 530. The distance 604 between top 611 and top 611' can be such as to approximate the distance between cyclist's 5 legs when the feet 6,7 are on pedals 200,300 during the peddling step of the learning method. In one embodiment this distance is adjustable, such as by provided two inlets in each crank shield 600,600' where one of the inlets is closer to top 611, and a second of the inlets is closer to the bottom 612 (one inlet can be pointing in the opposite direction relative to the first inlet.

Figure 9:
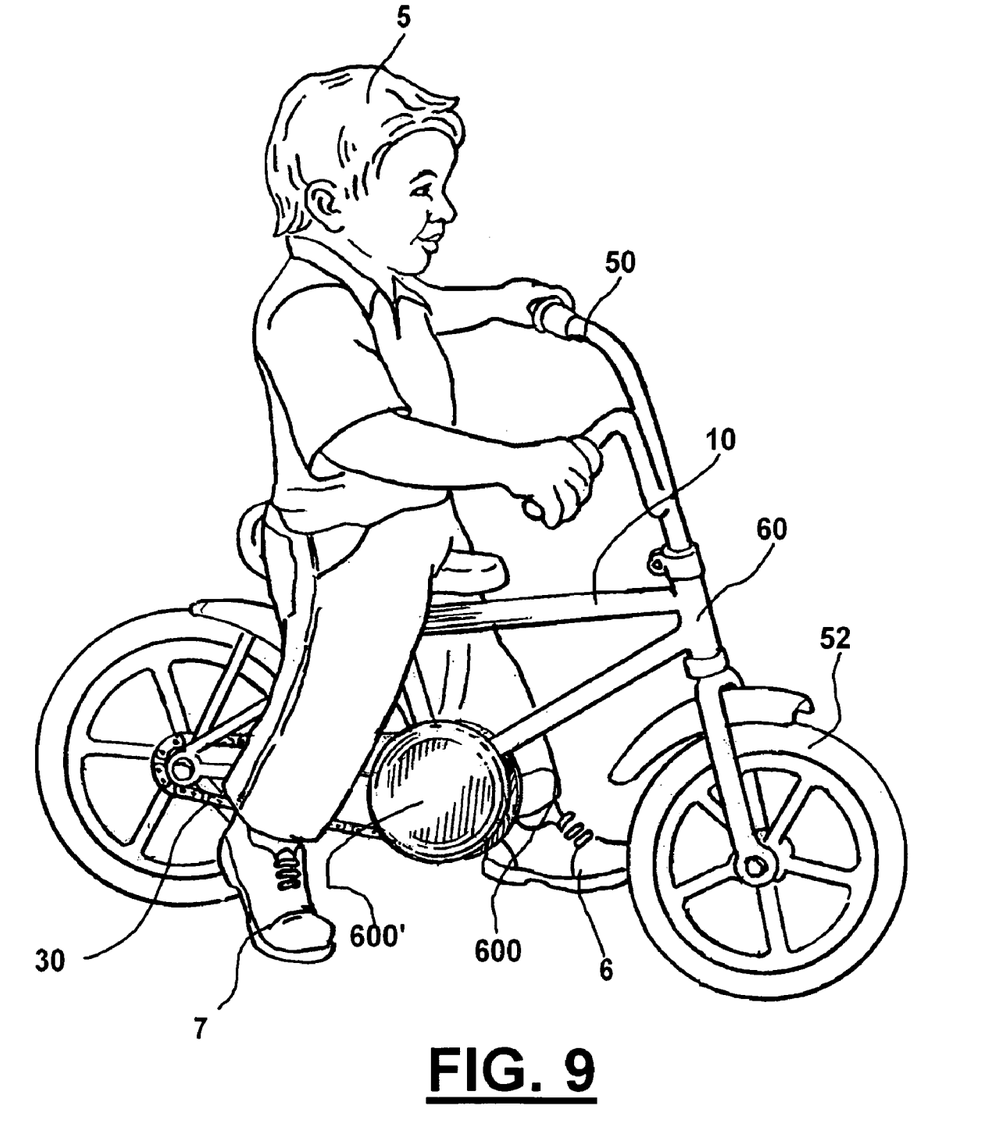
FIG. 9 is a side perspective view of a child learning to ride a training bicycle with the lower crank arm portions and pedals removed, and the crank shields installed.
Figure 10:
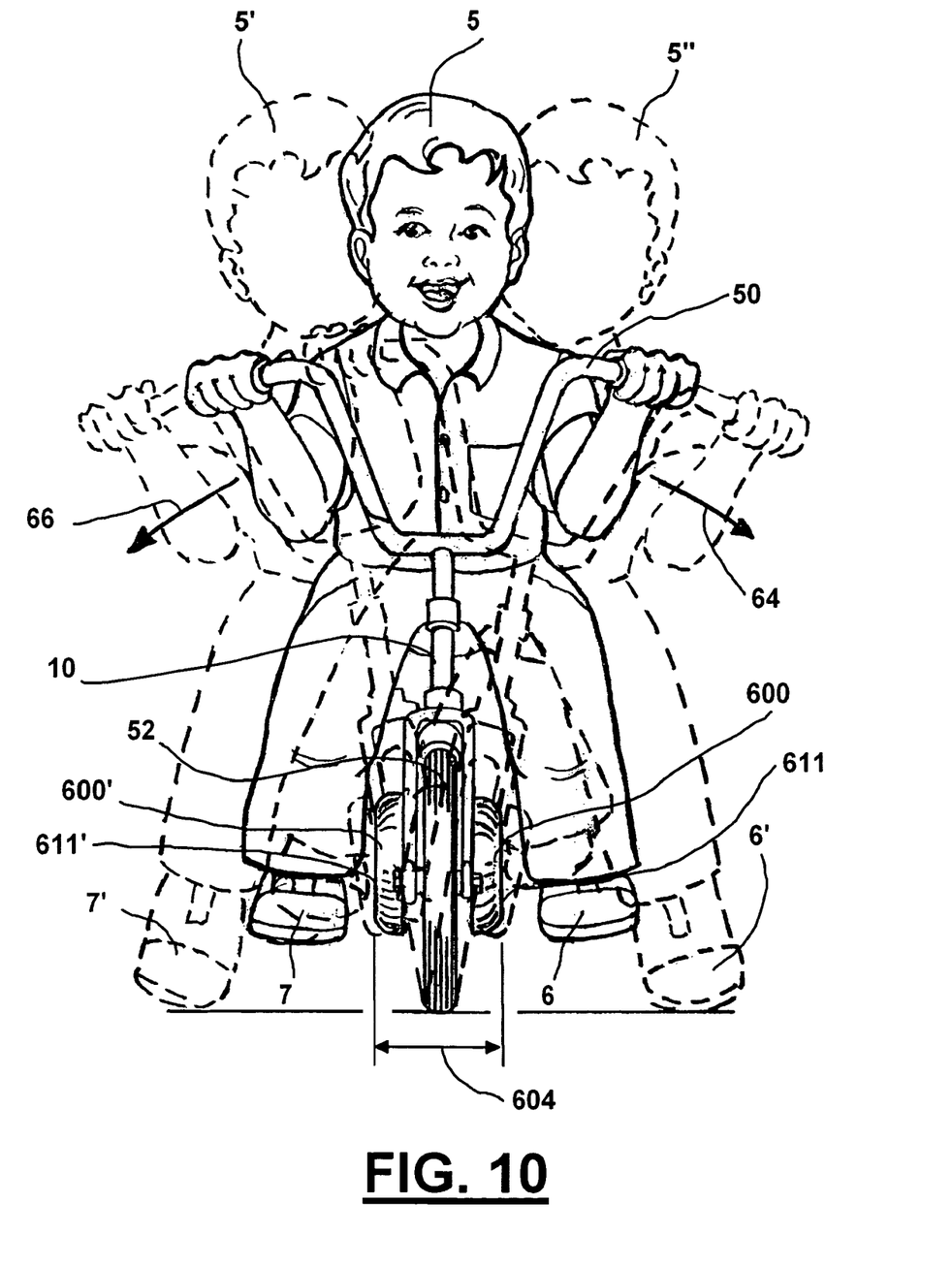
FIG. 10 is a front perspective view of the child riding the training bicycle of FIG. 9.

FIG. 9 is a side perspective view of a beginning cyclist 5 learning to ride a training bicycle 10 with the lower crank arm portions 540,580 and pedals 200,300 removed, and the crank shields 600,600' installed. Crank shields 600,600' protect the cyclist's legs and feet 6,7 from getting snagged/stuck during the balancing/coasting step of learning. FIG. 10 is a front perspective view of the beginning cyclist 5 learning to ride training bicycle 10. This figure schematically shows the balancing/coasting step of learning. The child 5 can push training bicycle 10 forward with feet 6,7. Arrow 64 schematically indicates that bicycle 10 has tilted to the right (looking at bicycle 10 from the front). Here, child 5 can use foot 6' to assist in balancing (additionally, child can learn to balance by moving body and head to the position shown in 5'). Arrow 66 schematically indicates that bicycle 10 has tilted to the left (looking at bicycle 10 from the front). Here, child 5 can use foot 7' to assist in balancing (additionally, child can learn to balance by moving body and head to the position shown in 5").

Additionally, when training bicycle moves to positions indicated by arrows 64 and 66, shields 600,600' prevent legs and feet 6,7 from being hindered and/or snagged. Additionally, the curved surfaces of shields 600,600' resist snagging even when bicycle 10 is tilted.

After the beginning cyclist 5 has sufficiently learned to balance and coast with the pedals 200,300 (and at least a portion of the crank arms) removed, then shields 600,600' can be removed and lower portions 540,580 of crank 100 (along with pedals 200,300) can be installed on crank 100 to start training the beginning cyclist for balancing and coasting while peddling.

Now, in the peddling step the child 5 has learned to balance and/or coast with the pedals 200,300 (and at least a portion of the crank arms) removed. This balancing and/or coasting will greatly assist the child 5 when peddling on training bicycle 10. Additionally, when peddling on training bicycle 10, the positioning of the child's 5 legs and feet 6,7 are about the same as in the previous step. Additionally, the same bicycle 10 is used in both the coasting/balancing learning step along with the peddling step. In this way the child 5 will not have to deal with a different bicycle when changing from one step to the other.

After the child 5 has learned to balance and coast with the pedals 200,300, training bicycle can be used as the permanent bicycle for child 5. The various quick connect/quick disconnect will not interfere with normal riding of the bicycle.

Various embodiments can be used for removing pedals 200,300, and at least a portion of the crank arms.

Figures 11, 12:
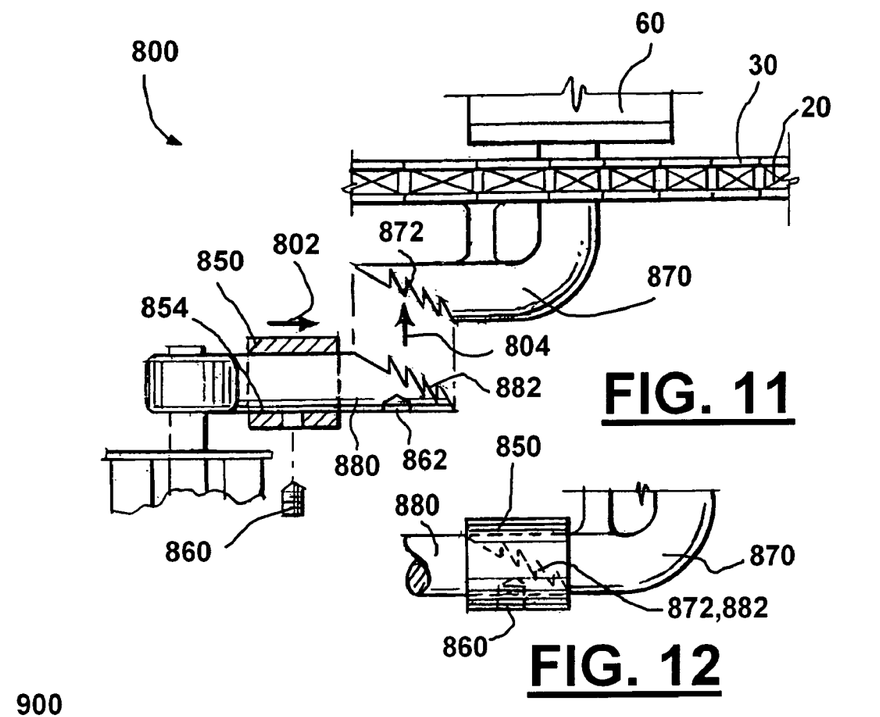
FIGS. 11 and 12 show an alternative quick connect/quick disconnect for the upper and lower portions of a crank arm.

FIGS. 11 and 12 show an alternative quick connect/quick disconnect 800 for the upper 870 and lower 880 portions of a crank arm. Only one side of the crank arm will be described as the opposite side is substantially the same. Upper portion 870 can include serrated area 872. Lower portion 880 can include serrated area 882 which fits within serrated area 872. Arrow 804 schematically indicates that the upper 870 and lower 880 portions are being connected. Quick connect/quick disconnect 850 can be used to keep upper 870 and lower 880 portions together as shown in FIG. 12. Quick connect/quick disconnect 850 can slide over the contact area between serrated areas 872 and 882, and set screw 860 used to hold in quick connect/quick disconnect in place. Cooperating serrated areas 872 and 882 will prevent upper 870 and lower 880 portions from moving relative to each other.

Figures 13, 14:
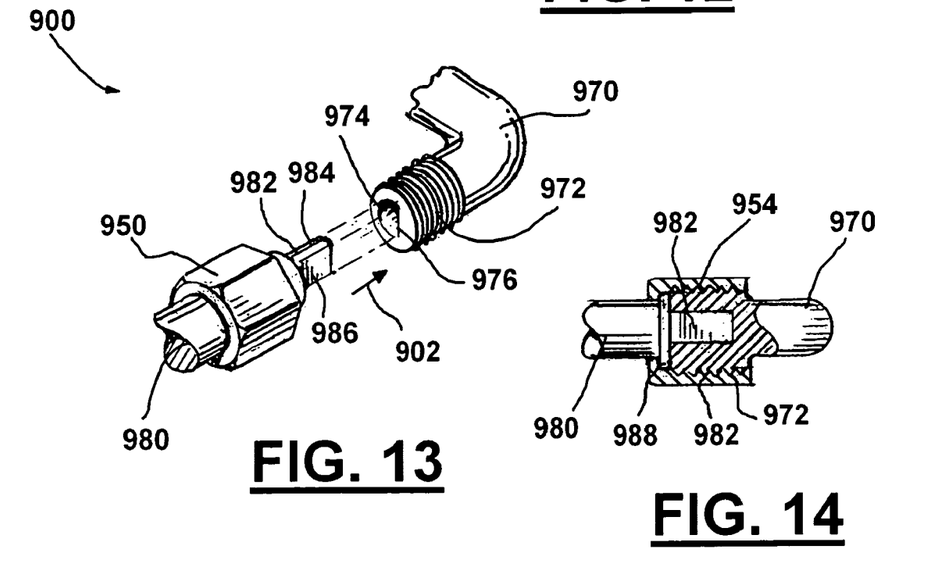
FIGS. 13 and 14 show another alternative quick connect/quick disconnect for the upper and lower portions of a crank arm.

FIGS. 13 and 14 show another alternative quick connect/quick disconnect 950 for the upper 970 and lower 980 portions of detachable crank arms 900. Only one side of the crank arm will be described as the opposite side is substantially the same. Upper portion 970 can include threaded area 972 and opening 974 with flat portion 976. Lower portion 980 can include protruding section 982 with flat portion 986 which fits within opening 974. Lower portion can also include quick connect/quick disconnect 950 which is rotatively connected to lower portion 980, and can be threadably connected to upper portion 970. Arrow 902 schematically indicates that the upper 970 and lower 980 portions are being connected. Quick connect/quick disconnect 950 can be used to keep upper 970 and lower 980 portions together as shown in FIG. 14. Quick connect/quick disconnect 950 thread onto threaded area 972 of upper portion 970. Enlarged base 988 of quick connect/quick disconnect 950 rotatively connects quick connect/quick disconnect to upper portion 970. Cooperating protruding section 982 and opening 974 will prevent upper 970 and lower 980 portions from moving relative to each other. Unscrewing quick connect/quick disconnect allows upper 970 and lower 980 to be separated again. Guard shield can be placed over exposed upper section 970.

Figure 15:
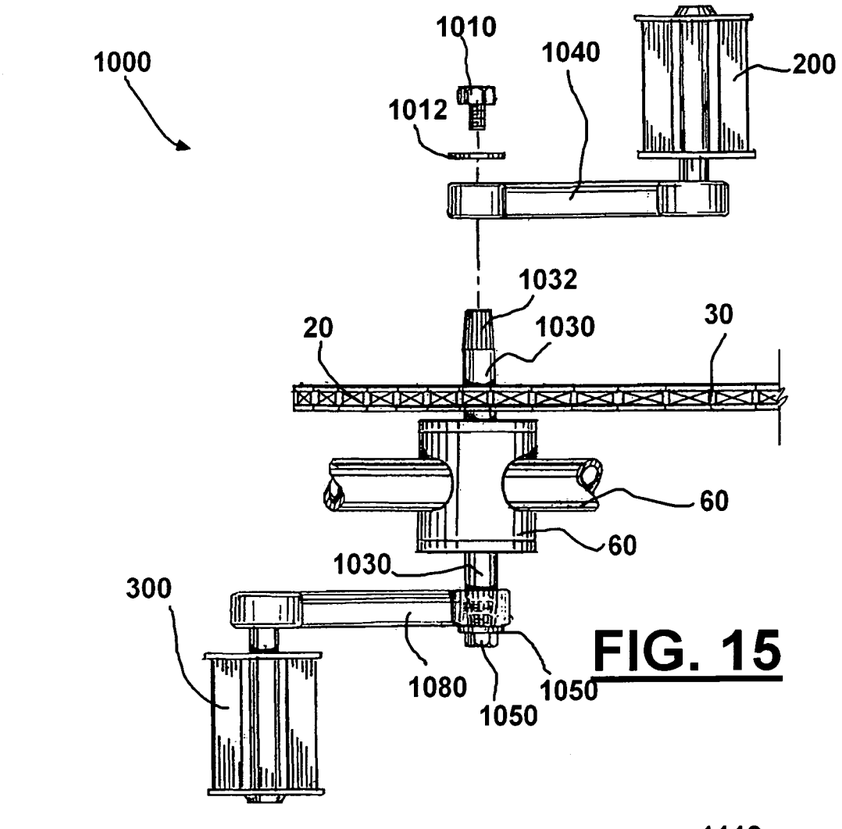
FIG. 15 shows another alternative quick connect/quick disconnect for removing a portion of the crank arm, where most of the crank arm is removed.
Figure 16:
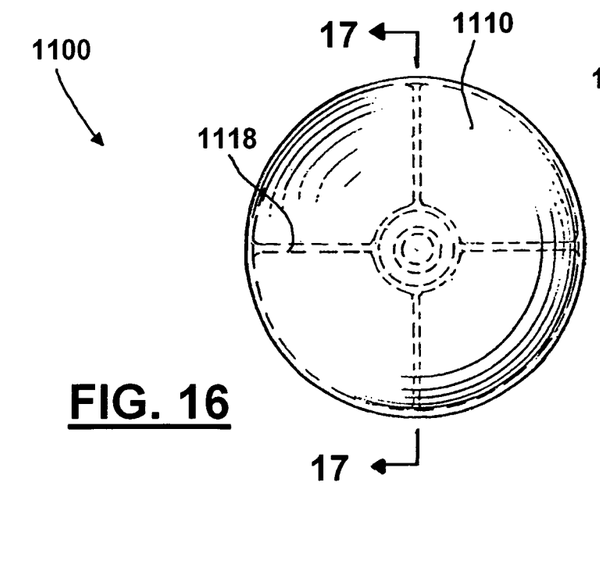
FIG. 16 is a top view of a crank shield which can be used for the embodiment shown in FIG. 15.
Figure 17:
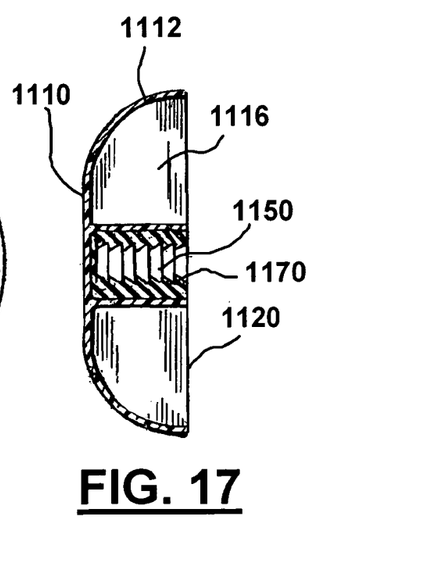
FIG. 17 is a sectional view of the crank shield of FIG. 16 taken along the line 17-17.
Figure 18:
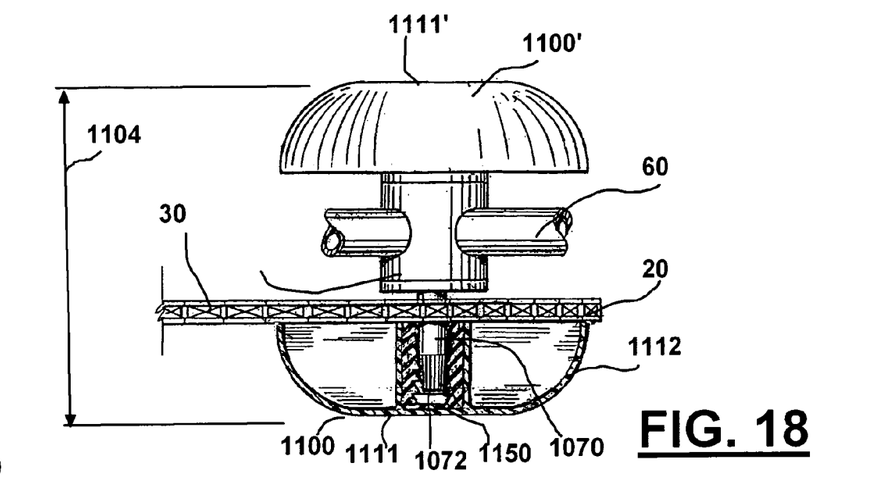
FIG. 18 is a bottom perspective view of two crank shields of the construction of FIGS. 16 and 17 placed on the embodiment shown in FIG. 16.

FIGS. 15 through 18 show an alternative quick connect/quick disconnect 1000 for the upper and lower portions of a crank arm. FIG. 15 shows another alternative quick connect/quick disconnect 1000 for removing a portion of the crank arm, where most of the crank arm is removed. FIG. 16 is a top view of a crank shield 1100 which can be used this embodiment. FIG. 17 is a sectional view of crank shield 1100 taken along the line 17-17 of FIG. 16. FIG. 18 is a bottom perspective view of two crank shields 1100,1100' placed on crank shaft 1030. In this embodiment cranks arms 1040 and 1080 are detachably connected to crank shaft 1030 by respective threaded fasteners 1010 and 1050. Splined areas 1032 and 1052 can be used to non-rotatively connect crank arms 1040 and 1080 to crank shaft. In this embodiment guard shield 1100 can be used. Shield 1100 can comprise outer shell 1110 having a side 1112 and interior 1116. In this embodiment reinforcement 1118 is shown (which reinforcement can be used in other embodiments). A detachable connection between shield 1100 and crank shaft 1030 can be achieved by opening 1150 with serrated area 1170. Serrated area 1170 can be comprised of a flexible material which frictionally connects with crank shaft 1030. Additionally, a second guard shield 1100' of the same construction can be used for the opposing side of crank shaft 1030. The size and dimensions of shield 1100 can be similar to shield 600. The different frictional connection 1150,1170 for shield 1100 is preferred because of the configuration of crank shaft 1030, compared to crank 100 where shield 600 is preferred.

Figures 19, 20:
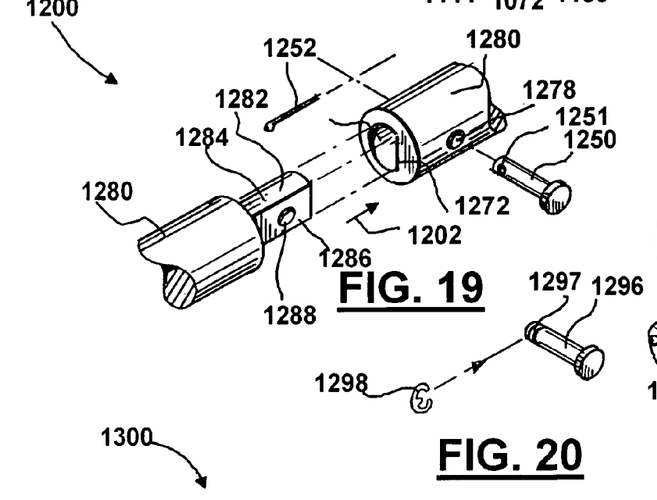
FIGS. 19 through 21 show another alternative quick connect/quick disconnect for the upper and lower portions of a crank arm.
Figure 21:
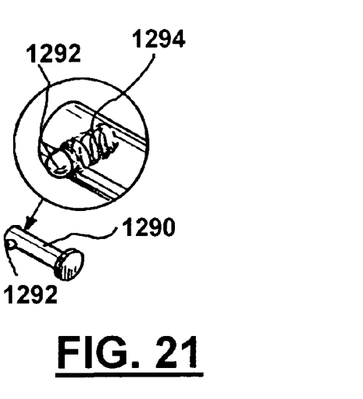

FIGS. 19 through 21 show other alternative quick connect/quick disconnects 1250 for the upper 1270 and lower 1280 portions of a crank arm 1200. Only one side of the crank arm will be described as the opposite side is substantially the same. Upper portion 1270 can include opening 1274 with flat portion 1276. Lower portion 1280 can include protruding section 1282 with flat portion 1286 which fits within opening 1274. Lower portion can also include opening 1288 for quick connect/quick disconnect 1250 which is a connecting pin, and itself can have opening 1251 for locking pin 1252. Arrow 1202 schematically indicates that the upper 1270 and lower 1280 portions are being connected. Quick connect/quick disconnect 1250 can be used to keep upper 1270 and lower 1280 portions together. Quick connect/quick disconnect 1250 can pass through opening 1275 (in upper portion 1270), opening 1288 (in protruding section 1282), and another opening in upper portion 1270 (although not shown). Cooperating protruding section 1282 and opening 1274 will prevent upper 1270 and lower 1280 portions from moving relative to each other. Pulling out quick connect/quick disconnect 1250 allows upper 1270 and lower 1280 portions to be separated again. Guard shield 600 can be placed over exposed upper section 1270. FIG. 20 shows an alternative quick connect 1296 with a locking clamp 1298 (which can be a C-clamp), which locks in perimeter groove 1297. FIG. 21 shows an alternative quick connect 1290 with a locking protruding section 1292 (which can be biased with spring or biasing means 1294), which locks with an interior recess in upper section 1270.

Figure 22:
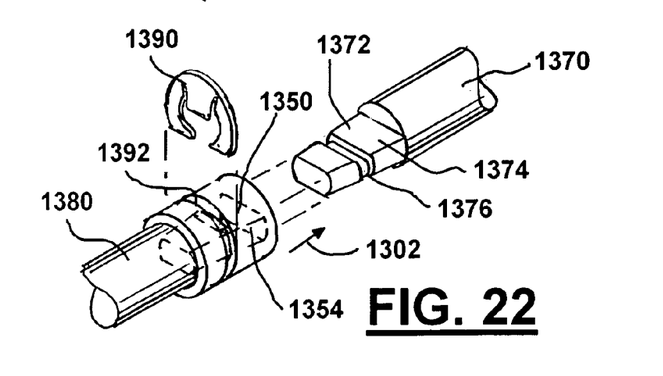
FIG. 22 shows another alternative quick connect/quick disconnect for the upper and lower portions of a crank arm.

FIG. 22 shows another alternative quick connect/quick disconnect 1350 for the upper 1370 and lower 1380 portions of a crank arm 1300. Only one side of the crank arm will be described as the opposite side is substantially the same. Upper portion 1370 can include protruding section 1382 with flat portion 1386 which fits within opening 1374 Lower portion 1380 can include opening 1354 with flat portion. Quick connect/quick disconnect can be connected to lower portion 1370 and include perimeter recess 1392. Arrow 1302 schematically indicates that the upper 1370 and lower 1380 portions are being connected. Quick connect/quick disconnect 1350 can be used to keep upper 1370 and lower 1380 portions together. C-clamp 1390 can be placed in recess 1392 and also connect to recess 1376 thereby keeping upper 1370 and lower 1380 sections together. Cooperating protruding section 1372 and opening 1354 will prevent upper 1370 and lower 1380 portions from moving relative to each other. Pulling out clamp 1390 allows upper 1370 and lower 1380 portions to be separated again. Guard shield 600 can be placed over exposed upper section 1370.

Figure 23:
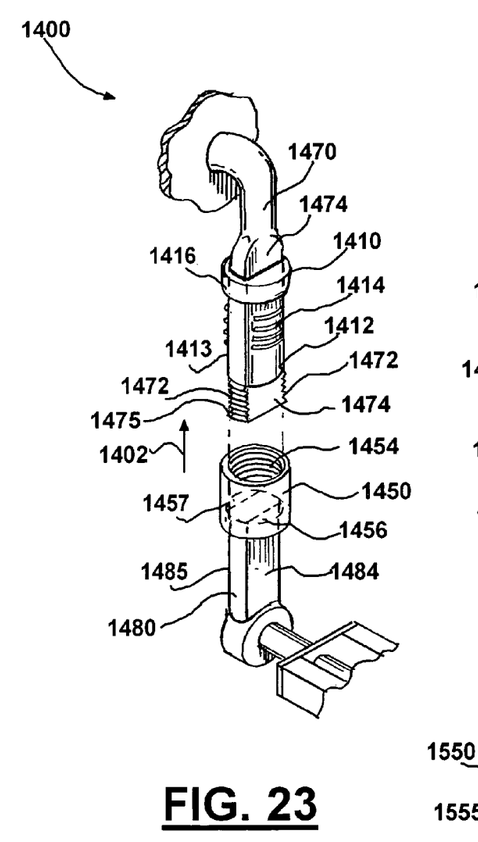
FIGS. 23 and 24 show another alternative quick connect/quick disconnect for the upper and lower portions of a crank arm.
Figure 24:
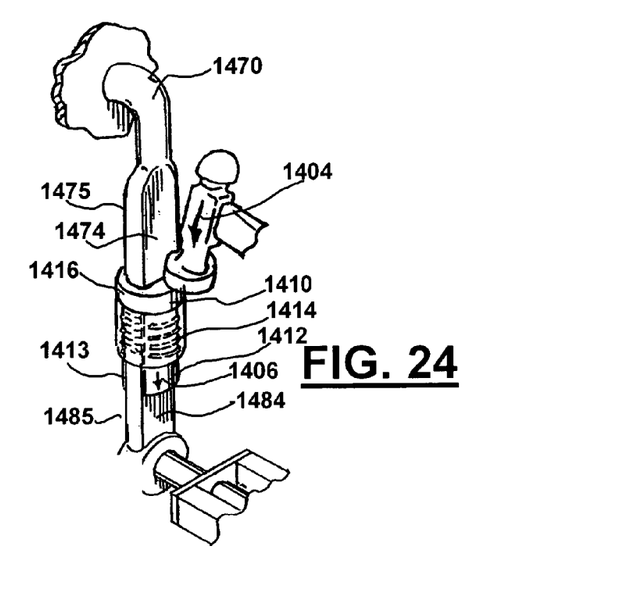

FIGS. 23 and 24 show another alternative quick connect/quick disconnect 1450 for the upper 1470 and lower 1480 portions of a crank arm 1400. Only one side of the crank arm will be described as the opposite side is substantially the same. Upper portion 1470 can include threaded area 1472 and flat portions 1474,1475. Slidably (but not rotatively) attached to upper portion 1470 can be locking insert 1410, which can include cap 1416, arms 1412,1413, and ribs 1414. Lower portion 1480 can include quick connect/quick disconnect 1450 fixedly attached. Quick connect/quick disconnect 1450 can include threaded area 1454 and lower openings 1456, 1457. Lower portion 1480 can also include flat portions 1484, 1485. Arrow 1402 schematically indicates that the upper 1470 and lower 1480 portions are being connected. Quick connect/quick disconnect 1450 can be used to keep upper 1470 and lower 1480 portions together as shown in FIG. 24. Quick connect/quick disconnect 1450 thread onto threaded area 1472 of upper portion 1470. Locking insert 1410 can be moved down (schematically indicated by arrow 1406), such as by tapping with a hammer (schematically indicated by arrow 1404) to prevent rotation between upper 1470 and lower 1480 portions. Arms 1412 and 1413 will pass through openings 1456,1457 and cooperate with flat areas 1484,1785. Pushing out locking insert 1410 allows upper 1470 and lower 1480 to be unscrewed and separated again. Guard shield can be placed over exposed upper section 1470.

Figures 25, 26:
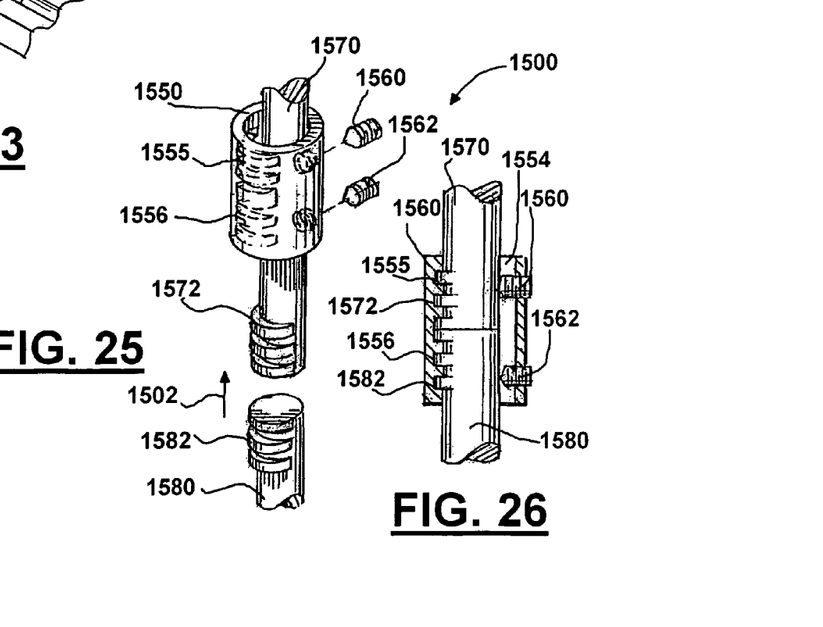
FIGS. 25 and 26 show another alternative quick connect/quick disconnect for the upper and lower portions of a crank arm.

FIGS. 25 and 26 show another alternative quick connect/quick disconnect 1550 for the upper 1570 and lower 1580 portions of a crank arm 1500. Only one side of the crank arm will be described as the opposite side is substantially the same. Upper portion 1570 can include plurality of ribs 1572. Lower portion 1580 can include plurality of ribs 1582. Arrow 1504 schematically indicates that the upper 1570 and lower 1580 portions are being connected. Quick connect/quick disconnect 1550 can be used to keep upper 1570 and lower 1580 portions together as shown in FIG. 26. Quick connect/quick disconnect 1550 can include cooperating recessed areas 1555,1556 (which accept protrusions 1572,1582) and can slide over the ends of upper 1570 and lower 1580 sections, and set screws 1560,1562 used to hold in quick connect/quick disconnect 1550 in place. Cooperating protrusions 1572,1582, and recessed areas 1555,1556 will prevent upper 1570 and lower 1580 portions from moving relative to each other.

Training Steps

In one embodiment the method of training a person to ride a bicycle includes the steps of: (a) providing a training bicycle, the training bicycle having removable crank arms, and shields for shielding portions of the crank arms remaining; (b) removing at least a portion of each crank arm; (c) placing the shields over the remaining portions of the crank arms; adjusting the training bicycle so that the person's feet can be placed squarely on the ground; (d) having the beginning cyclist, while seated on the training bicycle, first walk the bicycle forward with small steps, then progresses to longer strides, and finally culminates with coasting; (e) having the beginner lift his feet up off the ground for a longer period of time each time while coasting, allowing the beginning cyclist to learn how to coordinate the steering and balancing skills together; and (f) after the beginning cyclist has demonstrated balancing skills, installing the lower portions of the crank arms and pedals to allow the beginning cyclist to ride the bicycle while peddling himself.

With the above method the beginning cyclist learns how to balance and coast while his feet are position in a similar expanded position relative to the location of the cyclist's fees on the pedals so that an easy transition can be made from walking/coasting to actually peddling the training bicycle. This expanded position of the beginning cyclist's legs can be maintained without have snags and/or encumbrances to the feet of the beginning cyclist providing a feeling of freedom and security for this time period of the training. Prior art methods of training set up situations where the legs and/or feet of the beginning cyclist can be blocked, snagged, and/or encumbered limiting the ability of the beginner to achieve and/or maintain balance, causing a fall, and/or resistance/apprehension to future training.

In one embodiment the distance 604 between the tops 611,611' of the shields can be adjusted for different beginning cyclists to better approximate the position of the cyclist's feet when placed on the pedals during the peddling training step.

Additionally, when walking coasting the pedals and at least a portion of the crank arms are removed so that these items no longer interfere with the feet and balancing activities of the beginning cyclist. Additionally, the same training bicycle is used for both the walking/coasting phase along with the peddling phase.

Finally, when the skills are incorporated with the training bicycle using pedals for propulsion, the beginning cyclist 5 will have learned how to ride the bicycle successfully.

In one embodiment is provided a training conversion kit 2000 for converting a bicycle to a training bicycle. In this embodiment two guard shields 600,600' can be provided with a connector between the guard shields. The connector can be a strap, fastener or other attachment means for attaching the guard shields to the frame 60. In this embodiment instructions 2100 are provided with the kit 2000 to teach how to removed the crank 100, pedals 200,300, driving gear 20, and chain 30 (and possibly chain guard 40) of a conventional bicycle from the crank case 61, and then install the shields 600,600' over the crank case 61. After the shields 600,600' are installed over the crank case 61, the balancing/coasting step without pedals can be performed as described above. After the beginning cyclist learns how to balance and coast without the pedals and cranks, the instructions can teach how to re-install the crank 100, pedals 200,300, driving gear 20, and chain 30 (and possibly chain guard 40) on the conventional bicycle. The balancing/coasting training step is now performed. This method is not preferred because of the substantial amount of work required for an individual to remove and re-install the crank 100, pedals 200,300, driving gear 20, and chain 30 (and possibly chain guard 40) compared to using quick connects/quick disconnects.

In one embodiment only the pedals 200,300 are removed and large guard shields are placed over the crank arms. This method is not preferred because of the large size of the guard shields, which must be at least as large as the entire length of the crank arms, and such large sized guard shields could obstruct and/or interfere with the feet of the beginning cyclist when learning to balance/coast without pedals.

REFERENCE NUMERAL LIST

| REFERENCE NO. | DESCRIPTION |
| --- | --- |
| 5 | child |
| 6 | foot |
| 7 | foot |
| 10 | training bicycle |
| 20 | driving sprocket |
| 30 | chain |
| 40 | chain guard |
| 50 | handle bars |
| 52 | front wheel |
| 60 | frame |
| 61 | crank case |
| 62 | seat |

-continued
REFERENCE NUMERAL LIST

| REFERENCE NO. | DESCRIPTION |
| --- | --- |
| 64 | arrow |
| 66 | arrow |
| 100 | crank |
| 200 | first pedal |
| 300 | second pedal |
| 500 | detachable crank arms |
| 502 | first crank arm |
| 504 | second crank arm |
| 510 | first quick connect/quick disconnect |
| 512 | body |
| 514 | opening |
| 515 | threaded area |
| 520 | set screw |
| 530 | upper portion of first crank arm |
| 532 | threaded area of upper portion of first crank arm |
| 540 | lower portion of first crank arm |
| 550 | second quick connect/quick disconnect |
| 552 | body |
| 554 | opening |
| 555 | threaded area |
| 554 | threaded area |
| 560 | set screw |
| 570 | upper portion of second crank arm |
| 572 | threaded area of upper portion of second crank arm |
| 580 | lower portion of second crank arm |
| 600 | shield |
| 604 | horizontal distance between outer shell tops |
| 610 | outer shell |
| 611 | top |
| 612 | side of outer shell |
| 613 | width |
| 614 | length |
| 615 | depth |
| 616 | interior of shell |
| 620 | bottom |
| 650 | opening for crank arm |
| 654 | slit |
| 660 | extended opening for crank arm |
| 670 | beveled area |
| 800 | detachable crank arms |
| 802 | arrow |
| 804 | arrow |
| 850 | quick connect/quick disconnect |
| 854 | opening |
| 860 | set screw |
| 862 | recess for set screw |
| 870 | upper portion of first crank arm |
| 872 | serrated area of upper portion of first crank arm |
| 880 | lower portion of first crank arm |
| 882 | serrated area of lower portion of first crank arm |
| 900 | detachable crank arms |
| 902 | arrow |
| 950 | quick connect/quick disconnect |
| 954 | opening |
| 960 | threaded area |
| 970 | upper portion of first crank arm |
| 972 | threaded area of upper portion of first crank arm |
| 974 | opening |
| 976 | flat portion |
| 980 | lower portion of first crank arm |
| 982 | protruding section of lower portion of first crank arm |
| 984 | rounded portion |
| 986 | flat portion |
| 988 | base |
| 1000 | detachable crank arms |
| 1010 | threaded fastener |
| 1012 | washer |
| 1030 | crank shaft |
| 1032 | splined area |
| 1040 | crank arm |
| 1050 | threaded fastener |
| 1052 | washer |
| 1080 | crank arm |
| 1100 | shield |

-continued

REFERENCE NUMERAL LIST

| REFERENCE NO. | DESCRIPTION |
| --- | --- |
| 1104 | horizontal distance between outer shell tops |
| 1110 | outer shell |
| 1111 | top |
| 1112 | side of outer shell |
| 1116 | interior of shell |
| 1118 | reinforcement |
| 1120 | bottom |
| 1150 | opening for crank arm |
| 1170 | beveled area |
| 1200 | detachable crank arms |
| 1202 | arrow |
| 1250 | quick connect/quick disconnect |
| 1251 | opening |
| 1252 | locking pin |
| 1254 | opening |
| 1260 | threaded area |
| 1270 | upper portion of first crank arm |
| 1272 | threaded area of upper portion of first crank arm |
| 1274 | opening |
| 1276 | flat portion |
| 1278 | opening |
| 1280 | lower portion of first crank arm |
| 1282 | protruding section of lower portion of first crank arm |
| 1284 | rounded portion |
| 1286 | flat portion |
| 1288 | opening |
| 1290 | alternative quick connect/quick disconnect |
| 1292 | locking pin |
| 1294 | biasing member |
| 1296 | alternative quick connect/quick disconnect |
| 1297 | perimeter recess |
| 1298 | c-clamp |
| 1300 | detachable crank arms |
| 1302 | arrow |
| 1350 | quick connect/quick disconnect |
| 1354 | opening |
| 1370 | upper portion of first crank arm |
| 1372 | protruding and tapered portion of first crank arm |
| 1374 | flat portion |
| 1376 | recessed portion |
| 1380 | lower portion of first crank arm |
| 1390 | c-clamp |
| 1392 | recess |
| 1400 | detachable crank arms |
| 1402 | arrow |
| 1404 | arrow |
| 1406 | arrow |
| 1410 | locking insert |
| 1412 | arm |
| 1413 | arm |
| 1414 | ribbed section |
| 1416 | cap |
| 1450 | quick connect/quick disconnect |
| 1452 | opening |
| 1454 | threaded area |
| 1456 | first lower opening |
| 1457 | second lower opening |
| 1470 | upper portion of first crank arm |
| 1472 | threaded area of upper portion of first crank arm |
| 1474 | flat area |
| 1475 | flat area |
| 1480 | lower portion of first crank arm |
| 1484 | flat area |
| 1485 | flat area |
| 1500 | detachable crank arms |
| 1504 | arrow |
| 1550 | quick connect/quick disconnect |
| 1555 | recessed area for protrusions from upper portion of crank arm |
| 1556 | recessed area for protrusions from lower portion of crank arm |
| 1560 | set screw |
| 1562 | set screw |
| 1570 | upper portion of first crank arm |

-continued

REFERENCE NUMERAL LIST

| REFERENCE NO. | DESCRIPTION |
| --- | --- |
| 1572 | protrusions |
| 1580 | lower portion of first crank arm |
| 1572 | protrusions |

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A method of training a person to ride a bicycle comprising the steps of:
    (a) providing a training bicycle, the training bicycle including a crank, a crank case, wherein the crank is rotatively connected to the crank case, and pedals, the pedals being detachably connected to the crank;
    (b) removing the pedals from the bicycle;
    (c) after step "b", placing at least one guard shield on the bicycle which guard shield covers at least part of the crank case, and wherein the bicycle includes a driving sprocket connected to the crank and the at least one guard shield covers the driving sprocket;
    (d) after step "c" and before step "d", training the person to ride the bicycle;
    (e) after step "d", attaching the pedals on the bicycle; and
    (f) after step "e", training the person to ride the bicycle.

2. The method of claim 1, wherein in step "b" at least part of the crank is removed, and two guard shields are connected to the bicycle covering the crank case and covering the portions of the crank remaining after the pedals are removed.

3. A method of training a person to ride a bicycle comprising the steps of:
    (a) providing a training bicycle, the training bicycle including a crank, a crank case, wherein the crank is rotatively connected to the crank case, and pedals, the pedals being detachably connected to the crank;
    (b) removing the pedals from the bicycle;
    (c) after step "b", placing at least one guard shield on the bicycle which guard shield covers at least part of the crank case;
    (d) after step "c" and before step "d", training the person to ride the bicycle;
    (e) after step "d", attaching the pedals on the bicycle; and
    (f) after step "e", training the person to ride the bicycle;
    wherein the crank includes first and second crank arms, and the first and second crank arms each include upper and lower portions which are detachable from each other, the upper and lower portions of the first crank arm including a first quick connect/quick disconnect detachably connecting the these portions, and the upper and lower portions of the second crank arm including a second quick connect/quick disconnect detachably connecting these portions.

4. The method of claim 3, wherein the upper and lower sections are about the same length.

5. The method of claim 3, wherein the first and second quick connects include a threaded portions which threadably connect the upper and lower portions.

6. The method of claim 3, wherein the first and second quick connects include a threaded portions which threadably connect the upper and lower portions, and also include a locking insert which slidably locks in the quick connect and prevents further relative rotation between the upper and lower sections.

7. The method of claim 3, wherein the first and second quick connects include a plurality of slots which receive projections from the upper and lower portions of the first and second crank arms.

8. The method of claim 3, wherein the upper and lower sections of the first and second crank arms include serrated portions.

9. The method of claim 3, wherein the upper and lower sections of the first and second crank arms include an opening and cooperating projection.

10. The method of claim 3, wherein either the upper or lower section of the first and second crank arms include a recess for accepting a C-clamp.

11. The method of claim 2, wherein the guard shields have a horizontal external spacing, and the horizontal spacing is about the same as the minimum spacing between the pedals before being removed in step "b".

12. The method of claim 2, wherein the guard shields have a horizontal external spacing, and the horizontal spacing is about the same as the spacing between the horizontal centers of the pedals before being removed in step "b".

13. The method of claim 2, wherein the guard shields are hemispherically shaped.

14. The method of claim 13, wherein the two guard shields are the same size.

15. The method of claim 2, wherein the guard shields have a circular cross section, a flatted top, and rounded sides.

16. The method of claim 2, wherein the guard shields include a shell which is comprised of a hard polymer exterior, and a foam interior.

17. The method of claim 2, wherein the guard shields include an interior with an L-shaped opening.

18. The method of claim 2, wherein the guard shields include an interior with an L-shaped opening and a slit in the L-shaped opening.

19. A method of training a person to ride a bicycle comprising the steps of:
   (a) providing a training bicycle, the training bicycle including a crank, a crank case, wherein the crank is rotatively connected to the crank case, the crank including first and second crank arms, and the first and second crank arms each including upper and lower portions, the upper and lower portions of the first crank arm including a first quick connect/quick disconnect detachably connecting the upper and lower portions of the first crank arm, and the upper and lower portions of the second crank arm including a second quick connect/quick disconnect detachably connecting the upper and lower portions of the second crank arm, and pedals detachably connected to the lower portions of the first and second crank arms;
   (b) removing the lower portions of the first and second crank arms using the first and second quick connect/quick disconnects;
   (c) after step "b", placing a pair of guard shields on the upper sections of the first and second crank arms which guard shields;
   (d) after step "c" and before step "d", training the person to ride the bicycle;
   (e) after step "d", re-attaching the lower sections of the first and second crank arms using the first and second quick connect/quick disconnect; and
   (f) after step "e", training the person to ride the bicycle.

* * * * *